C. L. DU BOIS AND W. PAYNE.
SEWING MACHINE.
APPLICATION FILED MAY 18, 1915.

1,304,861.

Patented May 27, 1919.
4 SHEETS—SHEET 1.

WITNESS:

INVENTORS
Clarence L. DuBois &
William Payne
BY
Augustus B. Stoughton
ATTORNEY.

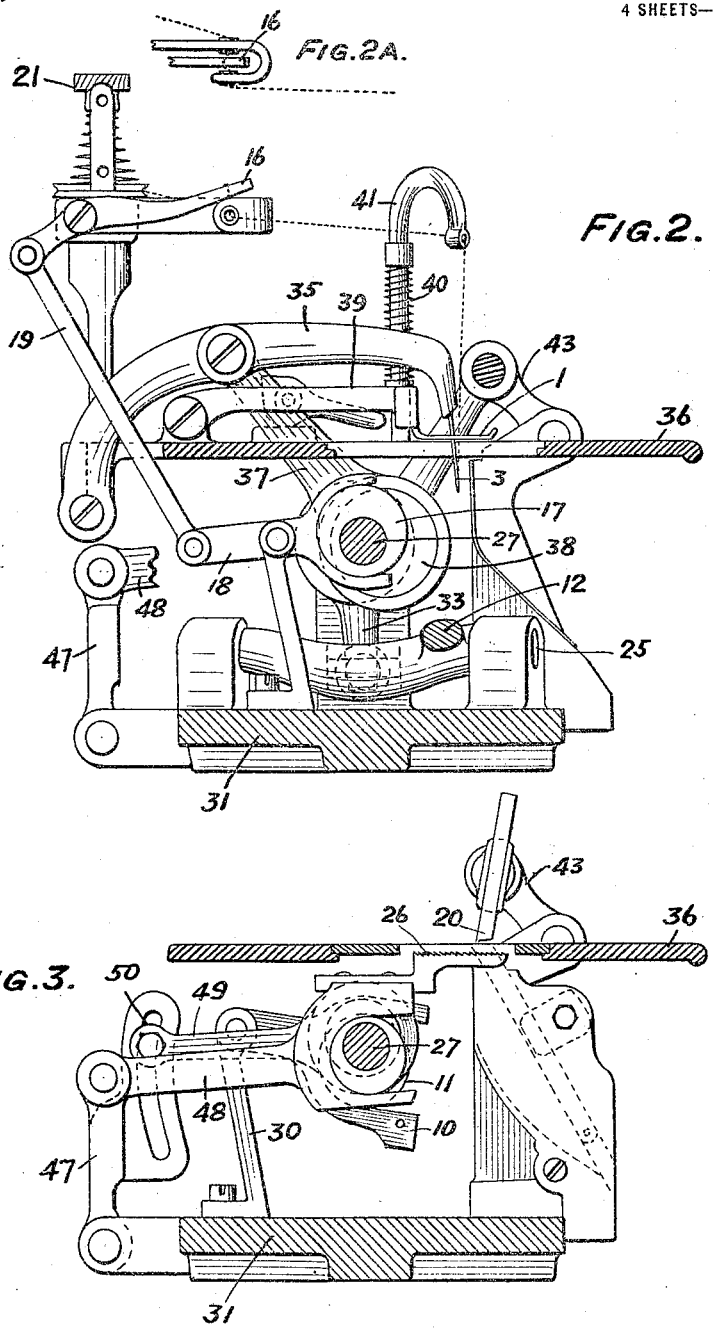

C. L. DU BOIS AND W. PAYNE.
SEWING MACHINE.
APPLICATION FILED MAY 18, 1915.
1,304,861.
Patented May 27, 1919.
4 SHEETS—SHEET 4.
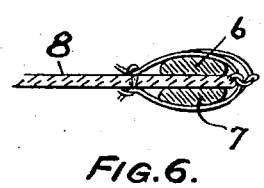
FIG.6.
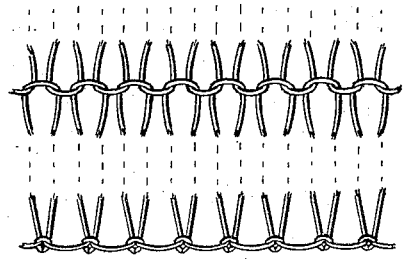
FIG.7.
FIG.8.
FIG.9.
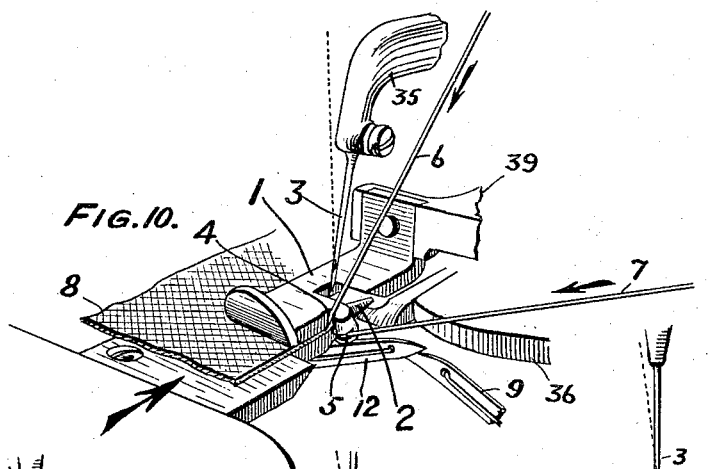
FIG.10.
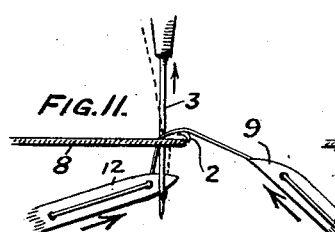
FIG.11.
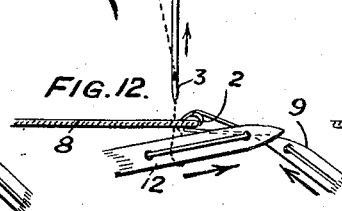
FIG.12.
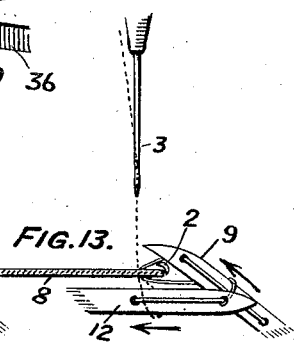
FIG.13.
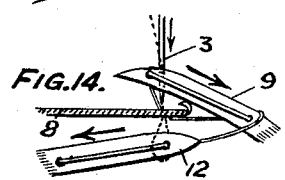
FIG.14.
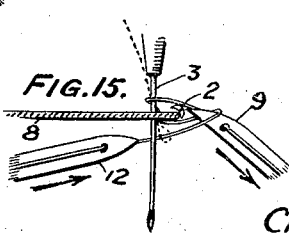
FIG.15.
FIG.16.
WITNESS:
Rob't R Kitchel
INVENTORS
Clarence L. DuBois &
William Payne
BY
Augustus B. Stoughton
ATTORNEY.

UNITED STATES PATENT OFFICE.

CLARENCE L. DU BOIS, OF WOODBURY, NEW JERSEY, AND WILLIAM PAYNE, OF PHILADELPHIA, PENNSYLVANIA, ASSIGNORS TO THE INDUSTRIAL MANUFACTURING COMPANY, OF CAMDEN, NEW JERSEY, A CORPORATION OF NEW JERSEY.

SEWING-MACHINE.

1,304,861.      Specification of Letters Patent.      Patented May 27, 1919.

Application filed May 18, 1915. Serial No. 28,825.

*To all whom it may concern:*

Be it known that we, CLARENCE L. DU BOIS and WILLIAM PAYNE, citizens of the United States, and residents, respectively, of Woodbury, in the county of Gloucester and State of New Jersey, and of Philadelphia, in the county of Philadelphia and State of Pennsylvania, have jointly invented certain new and useful Improvements in Sewing-Machines, of which the following is a specification.

The principal object of the present invention is to provide a simple, quick running and efficient sewing machine for finishing the cut or raw edge of lace curtains in such a way that it will be similarly finished on each side.

The invention will be claimed at the end hereof, but will be first described in connection with the embodiment of it illustrated in the accompanying drawings, in which—

Figs. 2 and 3 are sectional views taken on the line 2—3 of Fig. 1, but each with parts omitted for the sake of clearness.

Fig. 2ᴬ is a top or plan view of the take-up shown in Fig. 2.

Figure 1:
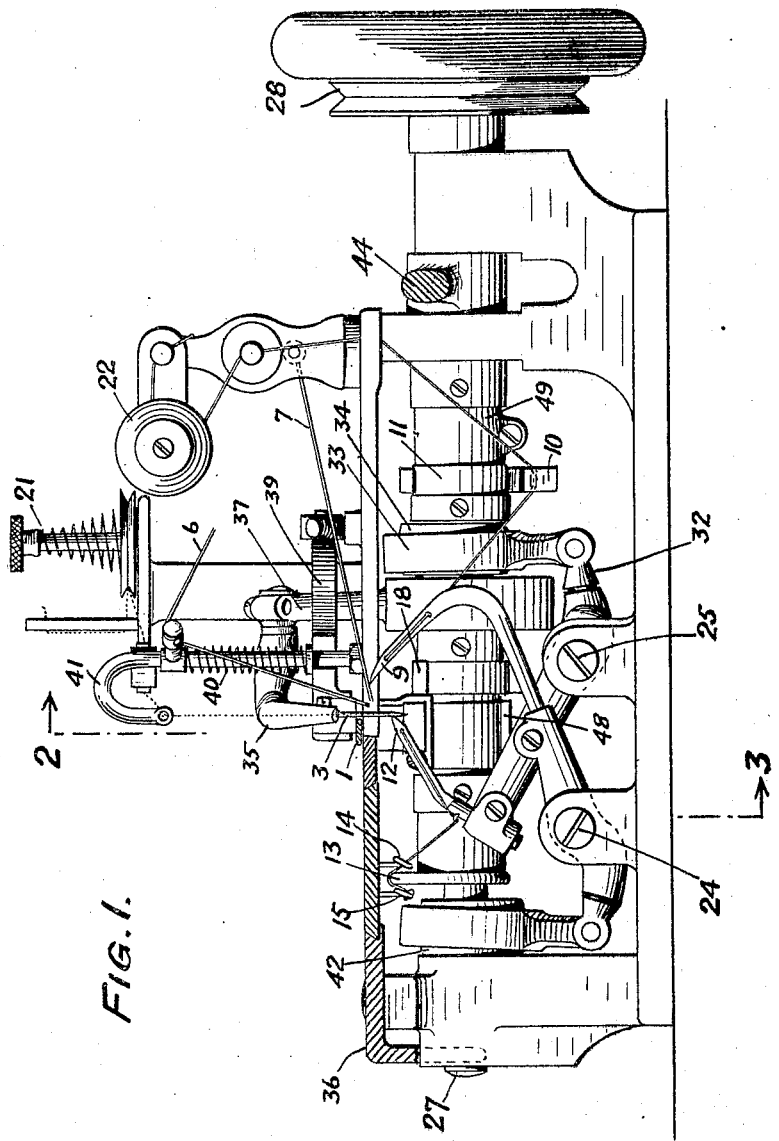
Figure 1, is a front view, principally in section, of a machine embodying features of the invention.
Figure 4:
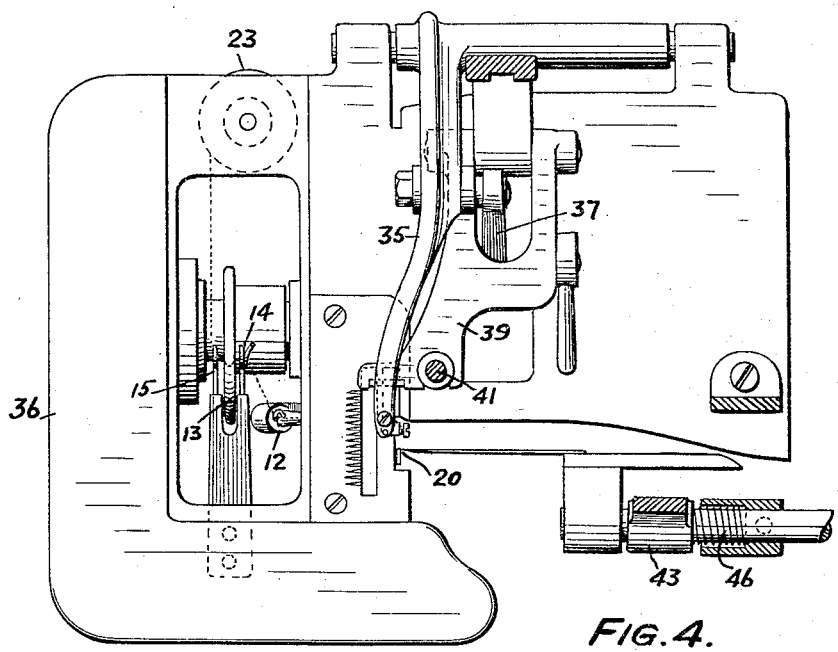

Fig. 4, is a top or plan view of the machine, partly in section, and with parts removed.

Figure 5:
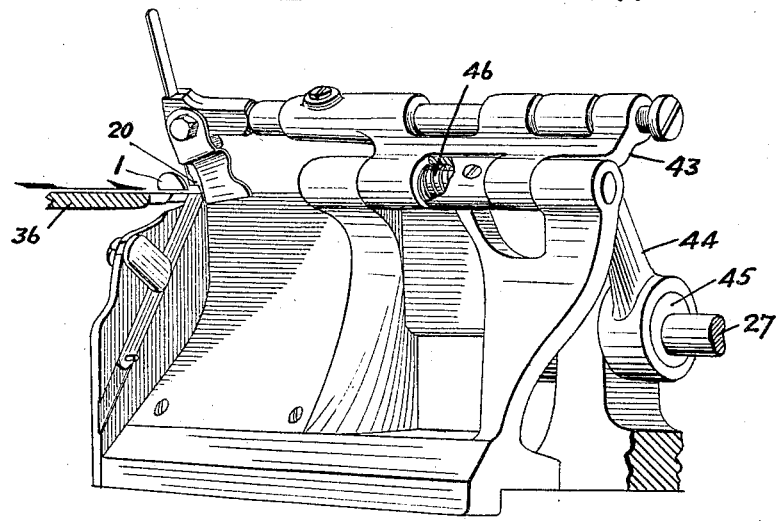

Fig. 5, is a perspective view of the trimmer.

Fig. 6, is a sectional view, largely diagrammatic and drawn to an enlarged scale, showing a section through the edge of the curtain.

Figs. 7, 8 and 9 are diagrammatic views showing the top, edge and bottom of the seam.

Fig. 10 is a perspective view illustrating certain of the parts, and

Figs. 11, 12, 13, 14, 15, and 16, are views illustrating the formation of the stitch.

In the drawings 1 is the presser foot and it is provided with a chaining point 2 arranged to the right of the needle 3 and extending backward from it in the line of the feed. This chaining point is provided with two notches 4 and 5, through which the top filler thread 6 and bottom filler thread 7 are respectively inserted so that one goes above and the other below the fabric 8 of the lace curtain. 9 is a right-hand threaded looper having a lever take-up 10 actuated by an eccentric 11. 12 is a left-hand threaded looper having a rotary take-up 13 acting between thread eyes 14 and 15. The needle take-up 16 is actuated from an eccentric 17 through a fork 18 and link 19. 20 is a trimmer arranged to operate in advance of the sewing. For each thread there is a tension device and the three tension devices are shown at 21, 22 and 23 respectively and they are duplicates of each other.

Figs. 11 to 16 illustrate the formation of the stitch shown in Figs. 7 to 9, and in section in Fig. 6. In Figs. 11 to 16 the arrows indicate the direction of motion and in connection with those figures it may be said that while one stitch is being started over the chaining point 2, toward the front thereof, another stitch is being finished at the point of the chaining point 2. The axes 24 and 25 of the right and left-hand threaded loopers are inclined so that the loopers work at an inclination and so transfer loops from the one to the other. The inclination of the axis 24 may be said to be three and one-half degrees and that of the axis 25 to be seven degrees. 26 is the feed. The various parts are operated from the shaft 27, which is continuously rotated by a pulley 28. The lever take-up 10 is the fork on the eccentric 11 on the main shaft and it is pivoted to a bracket 30, fast to the base 31. The left-hand looper is connected by a link 32 with the strap 33 of an eccentric 34 on the main shaft. The needle arm 35 is pivoted to a bracket at the rear of the work-table 36 and is connected by a link 37 which constitutes the strap of the eccentric 38 on the main shaft. The presser foot 1 is carried by an arm 39 pivoted to the work-table and held down by a spring 40 on the arm of the thread guide 41. The strap of the eccentric 42 on the main shaft operates the right-hand looper 9. The trimmer 20 is attached to the rocking frame 43 pivoted in a bracket arranged at the front of the machine and rocked by the strap connection 44 of an eccentric 45 on the main shaft. The spring 46 serves to keep the frame 43 toward the right in Fig. 5, up to its work. 47 is a rocker pivoted to the base of the machine and provided with a fork 48 cooperating with an eccentric on the main shaft and with a link 49 constituting the strap of an eccentric on the main shaft. The feed 26 is carried by the fork 48. The link 49 is adjustable as at 50 to permit of changes in the feed.

What we claim is:

In a sewing machine the combination of overseam stitch forming mechanism, and a presser foot provided with a chaining point to the right and back of the needle and parallel with the feed and having superposed filling thread guide notches, and means for operating said parts, substantially as described.

In testimony whereof we have hereunto signed our names.

CLARENCE L. DU BOIS.
WILLIAM PAYNE.

Witnesses:
CLIFFORD K. CASSEL,
FRANK E. FRENCH.

Copies of this patent may be obtained for five cents each, by addressing the "Commissioner of Patents, Washington, D. C."